United States Patent
Sharma

(10) Patent No.: US 11,223,756 B1
(45) Date of Patent: Jan. 11, 2022

(54) POSITION SENSOR AND HYBRID SUBSTRATE FOR CAMERA FOCUS MANAGEMENT

(71) Applicant: Waymo LLC, Mountain View, CA (US)

(72) Inventor: Shashank Sharma, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 198 days.

(21) Appl. No.: 16/702,054

(22) Filed: Dec. 3, 2019

(51) Int. Cl.
*G03B 17/55* (2021.01)
*H04N 5/225* (2006.01)

(52) U.S. Cl.
CPC ......... *H04N 5/2257* (2013.01); *H04N 5/2252* (2013.01); *H04N 5/2254* (2013.01); *G03B 17/55* (2013.01)

(58) Field of Classification Search
CPC .. H04N 5/2257; H04N 5/2252; H04N 5/2254; G03B 17/55
USPC ........................................................ 348/148
See application file for complete search history.

(56) References Cited

U.S. PATENT DOCUMENTS

| | | | |
|---|---|---|---|
| 5,101,278 A | 3/1992 | Itsumi et al. | |
| 7,529,476 B2 | 5/2009 | Kurosawa | |
| 8,098,289 B2 | 1/2012 | Chiou et al. | |
| 8,284,297 B2 | 10/2012 | Chou | |
| 8,994,298 B2 * | 3/2015 | Inaji | H02P 23/18 318/135 |
| 9,376,066 B2 | 6/2016 | Lu | |
| 9,578,217 B2 | 2/2017 | Gutierrez et al. | |
| 9,621,769 B2 | 4/2017 | Mai et al. | |
| 9,807,286 B2 | 10/2017 | Kim | |

(Continued)

FOREIGN PATENT DOCUMENTS

| | | |
|---|---|---|
| CN | 104717434 | 6/2015 |
| KR | 20160006435 | 1/2016 |

(Continued)

OTHER PUBLICATIONS

Blahnik et al., "Smartphone imaging technology and its applications," Adv. Opt. Techn., 2021, pp. 145-232, vol. 10, No. 3.

(Continued)

*Primary Examiner* — Jae N Noh
(74) *Attorney, Agent, or Firm* — McDonnell Boehnen Hulbert & Berghoff LLP

(57) ABSTRACT

An apparatus includes a lens assembly that includes at least one lens that defines an optical axis, a lens holder coupled to the lens assembly, a substrate, an image sensor disposed on the substrate, and an actuator coupled between the lens holder and the substrate and configured to adjust a position of the substrate relative to the lens assembly to reposition the image sensor along the optical axis. The apparatus also includes a position sensor that includes a magnet and a magnetic field sensor. The position sensor is coupled to the substrate and the lens holder. The magnetic field sensor is configured to generate magnetic field data indicating a position of the substrate relative to the lens holder. The apparatus additionally includes circuitry configured to control the actuator based on the magnetic field data to place the image sensor within a depth of focus of the lens assembly.

20 Claims, 10 Drawing Sheets

(56) References Cited

U.S. PATENT DOCUMENTS

| | | |
|---|---|---|
| 9,917,991 B2 | 3/2018 | Topliss |
| 10,136,040 B2 | 11/2018 | Topliss et al. |
| 10,257,933 B1 | 4/2019 | Hassemer et al. |
| 10,965,848 B1 | 3/2021 | Ba-Tis |
| 2008/0079829 A1 | 4/2008 | Choi et al. |
| 2008/0237443 A1 | 10/2008 | Oliver et al. |
| 2008/0284860 A1 | 11/2008 | Wu et al. |
| 2011/0285890 A1 | 11/2011 | Choi et al. |
| 2013/0194466 A1 | 8/2013 | Cheng et al. |
| 2015/0192750 A1 | 7/2015 | Shiraishi |
| 2018/0171991 A1 | 6/2018 | Miller et al. |
| 2019/0028620 A1 | 1/2019 | Park |
| 2019/0289218 A1* | 9/2019 | Liu .................. G01B 11/24 |
| 2020/0393691 A1 | 12/2020 | Owens et al. |
| 2021/0132327 A1 | 5/2021 | Sharma et al. |

FOREIGN PATENT DOCUMENTS

| | | |
|---|---|---|
| KR | 102169418 | 10/2020 |
| WO | 2014/074250 | 5/2014 |
| WO | 2021/040397 | 3/2021 |

OTHER PUBLICATIONS

Galaom, Ahmed Abdurabu Nasser, "Integrationof a MEMS-based Autofocus Actuator into a Smartphone Camera," Thesis—Mechanical and Industrial Engineering, University of Toronto, 2016, 123 pages.

La Rosa et al., "Optical Image Stabilization (OIS)," https://www.stmicroelectronics.com.cn/content/ccc/resource/technical/document/white_paper/c9/a6/fd/e4/e6/4e/48/60/ois_white_paper.pdf/files/ois_white_paper.pdf/jcr:content/translations/en.ois_white_paper.pdf, 2015, 26 pages.

* cited by examiner

POSITION SENSOR AND HYBRID SUBSTRATE FOR CAMERA FOCUS MANAGEMENT

BACKGROUND

An optical system may include one or more lenses and an image sensor. The image sensor may include a plurality of light-sensing pixels that measure an intensity of light incident thereon and thereby collectively capture an image of an environment. A Bayer filter may be applied to the image sensor to allow the image sensor to generate color images of the environment. Optical systems may be used in a plurality of applications such as photography, robotics, and autonomous vehicles.

SUMMARY

An optical system or apparatus includes an image sensor disposed on a substrate, a lens, a lens holder coupled to the lens, an actuator connecting the lens holder to the substrate, and a position sensor coupled to the substrate and the lens holder. The position sensor may include a magnet and a magnetic field sensor. The apparatus also includes circuitry configured to control the actuator based on data from the position sensor to maintain the image sensor within a depth of focus of the lens. In some implementations, the substrate may include a ceramic printed circuit board (PCB), which may be electrically connected to a laminate-based PCB by way of a flexible PCB connector. The laminate-based PCB may include thereon connectors exposed outside a housing of the apparatus. The connectors may provide signals from the image sensor to other components outside of the apparatus. The laminate-based PCB may accommodate repeated plugging-in and unplugging from the connectors, while the ceramic PCB may, among other benefits, approximate the thermal expansion properties of the image sensor and provide a thermal path between the image sensor and the housing.

In a first example embodiment, an apparatus is provided that includes a lens assembly including at least one lens that defines an optical axis, a lens holder coupled to the lens assembly, a substrate, an image sensor disposed on the substrate, and an actuator coupled between the lens holder and the substrate and configured to adjust a position of the substrate relative to the lens assembly to reposition the image sensor along the optical axis. The apparatus also includes a position sensor that includes a magnet and a magnetic field sensor. The position sensor is coupled to the substrate and the lens holder. The magnetic field sensor is configured to generate magnetic field data indicating a position of the substrate relative to the lens holder. The apparatus additionally includes circuitry configured to control the actuator based on the magnetic field data to place the image sensor within a depth of focus of the lens assembly.

In a second example embodiment, a method is provided that includes receiving, from a position sensor that includes a magnet and a magnetic field sensor, magnetic field data indicative of a position of an image sensor relative to a lens assembly. The lens assembly includes at least one lens that defines an optical axis. The image sensor is disposed on a substrate. The position sensor is coupled (i) to the substrate and (ii) to a lens holder coupled to the lens assembly. The method also includes determining, based on the magnetic field data, a control signal for an actuator coupled between the lens holder and the substrate and configured to adjust a position of the substrate relative to the lens to reposition the image sensor along the optical axis. The method additionally includes providing the control signal to the actuator to place the image sensor within a depth of focus of the lens assembly.

In a third example embodiment, an apparatus is provided that includes a lens assembly including at least one lens that defines an optical axis, a lens holder coupled to the lens assembly, a ceramic PCB including a surface that defines a plane, and an image sensor disposed on the surface and electrically connected to the ceramic PCB. The apparatus also include a laminate-based PCB coupled to the lens holder and including one or more electrical connectors, and a flexible PCB connector electrically connecting the ceramic PCB to the laminate-based PCB such that electrical signals from the image sensor are provided by way of the one or more electrical connectors. The apparatus also includes an actuator coupled between the lens holder and the ceramic PCB and configured to adjust a position of the ceramic PCB relative to the lens assembly to reposition the image sensor along the optical axis, and a position sensor including a magnet coupled to the ceramic PCB and a magnetic field sensor connected to the laminate-based PCB. The magnetic field sensor is configured to generate magnetic field data indicating a position of the image sensor relative to the lens assembly.

In a fourth example embodiment, a non-transitory computer readable storage medium is provided having stored thereon instructions that, when executed by a computing device, cause the computing device to perform operations. The operations include receiving, from a position sensor that includes a magnet and a magnetic field sensor, magnetic field data indicative of a position of an image sensor relative to a lens assembly. The lens assembly includes at least one lens that defines an optical axis. The image sensor is disposed on a substrate. The position sensor is coupled (i) to the substrate and (ii) to a lens holder coupled to the lens assembly. The operations also include determining, based on the magnetic field data, a control signal for an actuator coupled between the lens holder and the substrate and configured to adjust a position of the substrate relative to the lens to reposition the image sensor along the optical axis. The operations additionally include providing the control signal to the actuator to place the image sensor within a depth of focus of the lens assembly.

In a fifth example embodiment, a system is provided that includes means for receiving, from a position sensor that includes a magnet and a magnetic field sensor, magnetic field data indicative of a position of an image sensor relative to a lens assembly. The lens assembly includes at least one lens that defines an optical axis. The image sensor is disposed on a substrate. The position sensor is coupled (i) to the substrate and (ii) to a lens holder coupled to the lens assembly. The system also includes means for determining, based on the magnetic field data, a control signal for an actuator coupled between the lens holder and the substrate and configured to adjust a position of the substrate relative to the lens to reposition the image sensor along the optical axis. The system additionally includes means for providing the control signal to the actuator to place the image sensor within a depth of focus of the lens assembly.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
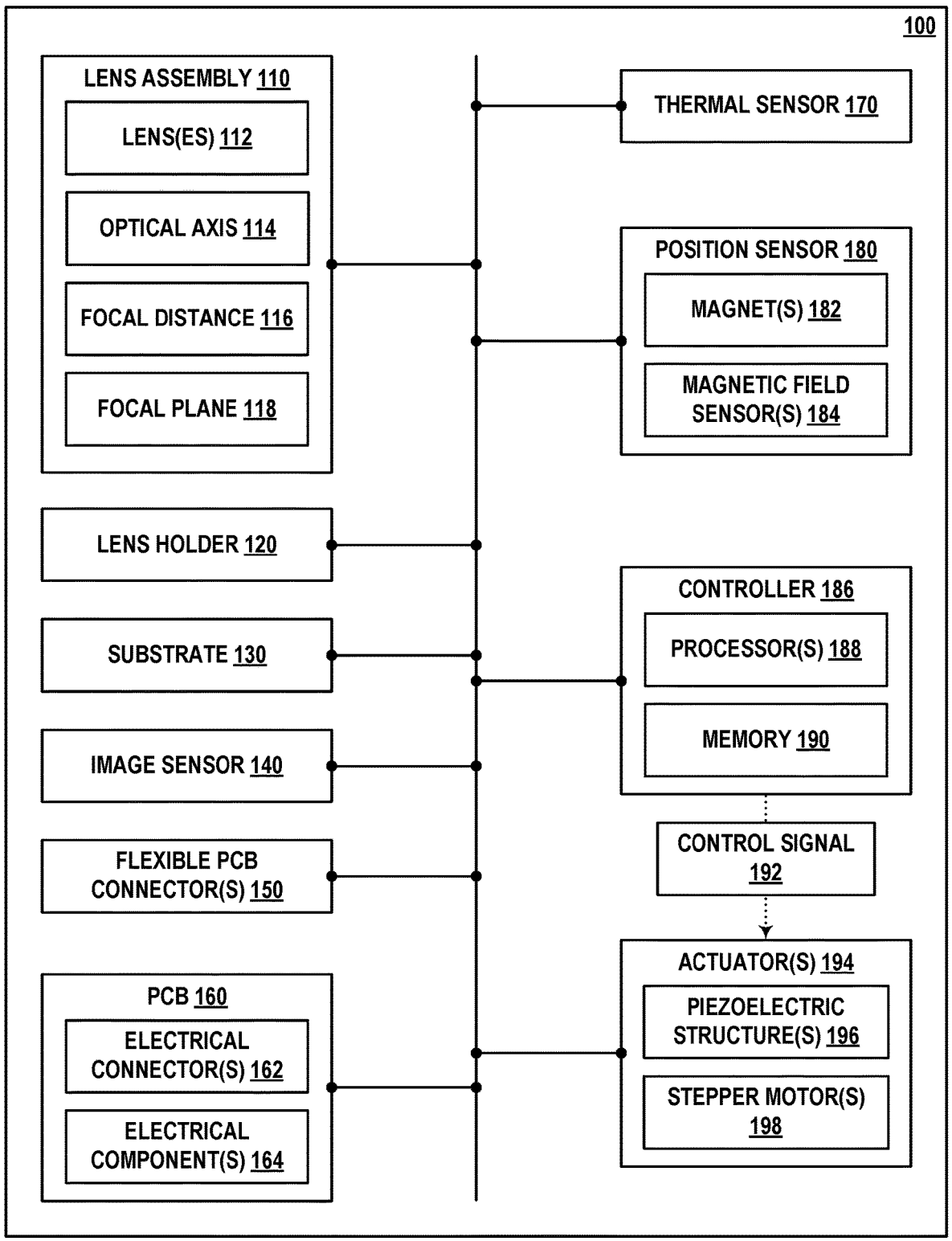
FIG. 1 illustrates an optical system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

A camera device may include an image sensor and one or more lenses that form a lens assembly and are configured to focus light on the image sensor. The image sensor may be disposed on a substrate, such as a printed circuit board (PCB), which may be positioned relative to the lens assembly by way of a lens holder. In some implementations, the relative positioning of the image sensor and the lens may be fixed. In such an arrangement, however, it may be difficult to maintain the image sensor within a depth of focus of the lens assembly as camera components expand and contract due to changes in temperature. This may be especially problematic in automotive applications where, in addition to thermal gradients inside the camera, ambient temperatures experienced by the camera may fluctuate between, for example, −30 degrees Celsius and 85 degrees Celsius.

Specifically, different portions of the camera may expand and contract to different extents due to temperature changes, causing the image sensor to drift in and out of the depth of focus of the lens assembly, resulting in generation of out-of-focus images. The problem may be especially apparent where the image sensor includes a small pixel size (resulting in a smaller image sensor) and/or the lens has a low f-number, resulting in a small or shallow depth of focus (e.g., approximately 10 microns). A low depth of focus may limit the maximum extent of warpage of the image sensor that can occur before the generated images are out of focus.

Warpage may be especially problematic when a coefficient of thermal expansion (CTE) of the image sensor and/or its package is mismatched to a CTE of the substrate to which the image sensor is bonded. Such CTE mismatch may increase the extent to which the image sensor warps as ambient temperature changes. Further, the CTE mismatch may also lead to increased solder stress. For example, a ball grid array (BGA) connecting the image sensor to the substrate may experience increased stress and a higher rate of fatigue failures due to temperature cycling in the course of camera operation. In some cases, passive athermalization accomplished by matching the CTEs of different components may be helpful in reducing the extent of these problems. Nevertheless, in some cases, matching the CTEs of components may be insufficient and/or difficult due to manufacturing variations among the components.

Accordingly, an actuator may be connected between the substrate and the lens holder to allow for adjustments in the position of the image sensor along the optical axis of the lens. In one implementation, the actuator may be a linear actuator connecting the lens holder to the substrate. The actuator may shorten/contract to bring the image sensor closer to the lens and lengthen/expand to move the image sensor away from the lens. Moving the image sensor, rather than the lens, may facilitate sealing of the camera components within a compact housing. Further, since the combined weight of the image sensor and the substrate may be smaller than that of the lens assembly, moving the image sensor and substrate may involve less force than moving the lens.

The actuator may be a piezoelectric actuator. For example, the actuator may include a stack of two or more linear piezoelectric actuators and/or a piezoelectric tube actuator. In another implementation, the actuator may be a bending actuator positioned along a plane defined by the substrate. The substrate may be fixedly connected to the lens holder at points along an outer periphery of the substrate. The bending actuator may be configured to induce bending or bowing of the substrate in and out of the plane of the substrate. By inducing bending in a first direction, the image sensor may be brought closer to the lens and, by inducing bending in the other direction, the image sensor may be moved away from the lens. The bending actuator may be implemented as a piezoelectric actuator, among other possibilities.

Piezoelectric actuators may provide high stiffness, resulting in a connection that resists deflection under random vibrations (e.g., in automotive applications). Piezoelectric actuators may also provide low holding power, thus further accommodating the automotive setting where adjustments in position are made and then maintained over the course of minutes (e.g., to account for temperature changes from sunny to shady environments), hours (e.g., to account for temperature changes from night to day operation), and/or months (e.g., to account for temperature changes from summer to winter environments). Further, in some implementations, the CTE of the piezoelectric actuators may be well-matched to the CTE of the substrate, such as when both of these components are made from ceramics, thereby providing additional passive athermalization.

The camera may also include a housing connected to the lens holder and configured to house the substrate, the image sensor, the actuator, and the PCB, among other components. Specifically, a chamber may be defined between the housing, the lens assembly, and the lens holder in which each of these components may be disposed. The plane defined by the surface of the substrate may be disposed along a first wall of the housing that is substantially perpendicular to the optical axis of the lens assembly. Thermal contact between the first wall and the substrate may allow heat from the image sensor to be dissipated through the housing.

The camera may also include a position sensor connected to the lens holder and the substrate to provide position feedback that allows the image sensor to be accurately positioned. In one implementation, the position sensor may include a magnet and a magnetic field sensor configured to generate magnetic field data indicating a strength of a magnetic field generated by the magnet along a particular direction. The magnet may be connected to the lens holder and the magnetic field sensor may be connected to the substrate, or vice versa, to measure the relative position of the lens relative to the image sensor. Notably, connecting the magnetic field sensor to the substrate (e.g., a PCB), rather than the lens holder, may facilitate the establishment of electrical connections for the sensor.

Control circuitry may be configured to receive the magnetic field data, determine a distance between the lens and the image sensor, and control the actuator to adjust the distance to a target distance (e.g., a distance that places the image sensor within the depth of focus of the lens). The position sensor may also allow the effects of any hysteresis or nonlinearities in the actuator to be accounted for when repositioning the substrate.

The substrate may be electrically connected to a PCB (other than the substrate) by way of a flexible PCB connector. The PCB may be connected to the lens holder and may include thereon one or more electrical connectors that provide access to the electrical signals generated by the image sensor. These electrical connectors may be exposed and/or accessible outside of the housing. Thus, images from the image sensor may be shared with other components connected to the camera by way of the one or more electrical connectors.

The flexible PCB connector allows the substrate and the PCB to be placed at different positions and/or in different orientations within the housing. For example, a plane defined by a surface of the PCB may be positioned in an orientation substantially parallel to the optical axis of the lens, while the plane defined by the surface of the substrate may be substantially perpendicular to the optical axis. The flexible PCB connector may also provide a variable bend radius between the PCB and the substrate. The variable bend radius may accommodate adjustments in the position of the substrate relative to the lens holder. The flexible PCB connector may thus allow for more control over the form factor of the camera and the locations within the housing at which the connectors are exposed through the housing.

In one implementation, the image sensor may be bonded to a first side of the substrate and the flexible PCB connector may be bonded to a second side of the substrate. A thermal interface material may be disposed between the flexible PCB connector and a portion of the housing to dissipate heat from the image sensor to the housing by way of the substrate, the flexible PCB connector, and the thermal interface material. In other implementations, the heat transfer from the image sensor to the housing may be improved by forming the thermal connection between the thermal interface material and the substrate directly, rather than by way of the flexible PCB connector. Accordingly, a portion of the flexible PCB connector that is bonded to the second side of the substrate may define an opening through which the thermal interface material extends to make thermal contact with the substrate. This portion of the flexible PCB connector may be bonded, for example, near a periphery of the substrate to define this opening.

In some implementations, the PCB may comprise a laminate-based PCB and the substrate may comprise a ceramic PCB. The camera may beneficially utilize two different types of PCBs and the flexible PCB connector, rather than utilizing a single PCB, to accommodate different operating conditions in different portions of the camera. For example, the PCB materials used around the integrated circuit package may be selected to meet target thermal specifications, while the PCB materials used around the external connectors may be selected to be robust to forces experienced during plugin of the connectors.

In particular, as the resolution, size, pixel density, and processing capabilities of the image sensors used in cameras increase, the extent of heat generated by the image sensor may increase, making cooling of the image sensor chip a challenge. Operating the chip outside of a target temperature range due to inadequate cooling may result in degraded image quality and reliability of the image sensor. Thus, the ceramic PCB, rather than the laminate-based PCB, may be used as a substrate for the image sensor to assist with transferring heat away from the image sensor and out through the housing. In some examples, the thermal conductivity of the ceramic PCB may be 50 to 100 times higher than the thermal conductivity of the laminate-based PCB. Further, the CTE of the ceramic PCB (e.g., 6-8 parts per million) may be better matched to the CTE of the image sensor than the CTE of the laminate-based PCB (e.g., 14-16 parts per million). Thus, by bonding the image sensor to the ceramic PCB, rather than the laminate-based PCB, warpage of the image sensor and solder stress may be reduced.

The ceramic PCB may, however, be more fracture-sensitive than the laminate-based PCB. Thus, connectors that may experience varied loads and stresses due to plugging into and unplugging from their mating connectors may be placed on the laminate-based PCB. Specifically, the laminate-based PCB may be more flexible and less brittle than the ceramic PCB, and thus capable of withstanding such repeated plugin loads and stresses.

The laminate-based PCB may have disposed thereon electrical components for processing or conditioning the electrical signals of the image sensor before these signals reach the electrical connectors and are exposed by way of the electrical connectors. By positioning these electrical components on the laminate-based PCB rather than the ceramic PCB, the thermal load around the integrated circuit package may be reduced. In some implementations, the ceramic PCB may also include thereon some electrical components. For example, components such as decoupling capacitors whose effectiveness depends on proximity to the integrated circuit package may be placed on the ceramic PCB. However, a majority of the electrical components may be placed on the laminate-based PCB.

In some implementations, the position sensor may be connected to the lens holder by way of the laminate-based PCB, which may be fixedly connected to the lens holder. For example, the magnet may be connected to the substrate and the magnetic field sensor may be connected to the laminate-based PCB, or vice versa. Thus, the magnetic field sensor may be disposed away from the high thermal load region around the sensor and in proximity to the circuitry configured to process the signal generated by the magnetic field sensor.

II. EXAMPLE OPTICAL SYSTEM

FIG. 1 illustrates an optical system 100. Optical system 100 may include lens assembly 110, lens holder 120, substrate 130, image sensor 140, PCB 160, thermal sensor 170, position sensor 180, controller 186, and actuator(s) 194. In some embodiments, optical system 100 may include and/or represent a camera system or a light detection and ranging (LIDAR) system. That is, optical system 100 could include and/or represent systems for capturing video and/or still images, and/or LIDAR point cloud data.

Lens assembly 110 may include lens(es) 112. Lens(es) 112 may define an optical axis 114, a focal distance 116, and a focal plane 118, among other optical characteristics. Lens(es) 112 could include, for example, a spherical lens, an aspherical lens, a cylindrical lens, a Fresnel lens, a gradient index lens, and/or a diffractive optical lens, among other possibilities. Lens(es) 112 could be formed from plastic, glass, or another optical material. Lens holder 120 may be coupled to lens assembly 110 to position lens(es) 112 with respect to substrate 130 and/or image sensor 140, among other components.

Substrate 130 may include a first surface and a second surface. In some embodiments, substrate 130 could include a printed circuit board (PCB), a semiconductor substrate, or another flexible or rigid body. Image sensor 140 may be attached to the first surface of substrate 130. The material of substrate 130 may be selected to (i) match a CTE of image sensor 140 and (ii) provide high thermal conductivity to allow for efficient cooling of image sensor 140, among other considerations. For example, substrate 130 may include a ceramic PCB made out of alumina, aluminum nitride, beryllium oxide, or another ceramic material. In some implementations, the ceramic PCB may be a co-fired ceramic, such as a high temperature co-fired ceramic (HTCC) or a low temperature co-fired ceramic (LTCC). In one example, the ceramic PCB may be bonded to image sensor 140 by way of a ball grid array.

PCB 160 may be mounted to lens holder 120. PCB 160 may include electrical connector(s) 162 and electrical component(s) 164. PCB 160 may be electrically connected to substrate 130 by way of flexible PCB connector(s) 150. PCB 160 may include, for example, a laminate-based PCB configured to accommodate repeated plugging into and unplugging from electrical connector(s) 162. The laminate-based PCB may be formed from laminae bonded together with a polymer resin. For example, the laminate-based PCB may be an FR-4 board (i.e., fiberglass layers bonded with epoxy resin), a CEM-3 board, or another non-ceramic material having similar physical properties.

Flexible PCB connector(s) 150 may provide a variable bend radius to accommodate repositioning of lens holder 120, on which PCB 160 is mounted, relative to substrate 130. Flexible PCB connector(s) 150 may be made out of polytetrafluoroethylene, polyimide, and/or polyether ether ketone, among other similar materials.

Electrical connector(s) 162 may be exposed outside of a housing of optical system 100 and configured to provide at least a portion of signals generated by image sensor 140. Electrical component(s) 164 may be configured to process signals generated by image sensor 140, magnetic field sensor(s) 184, and other components of optical system 100 (e.g., before such signals are exposed outside of the housing by way of electrical connector(s) 162).

Actuator(s) 194 may include piezoelectric structure(s) 196 coupled between lens holder 120 and substrate 130. In some embodiments, at least a portion of piezoelectric structure(s) 196 could be arranged coaxially about the optical axis 114. Piezoelectric structure(s) 196 may be formed from a variety of piezoelectric materials, including, but not limited to, lead zirconate titanate (e.g., PZT), lithium niobate, barium titanate, potassium niobate, sodium tungstate, sodium potassium niobate, bismuth ferrite, among other possibilities.

In some embodiments, piezoelectric structure(s) 196 could include a piezoelectric tube. For example, the piezoelectric tube could be a piezoelectric tube actuator, such as Thorlabs PT49LM or PI PT120-PT140 Series piezo tubes. In some embodiments, the piezoelectric tube could be configured to provide a desired axial expansion/contraction value and/or a desired diameter expansion/contraction value based on a known or expected thermally-induced expansion or contraction of various components of the optical system 100. The piezoelectric tube may be controllable so as to adjust at least one of (i) a distance between lens(es) 112 and image sensor 140 or (ii) a tip or tilt of image sensor 140 with respect to focal plane 118, among other aspects of the geometric arrangement of elements in optical system 100.

In other embodiments, piezoelectric structure(s) 196 could additionally or alternatively include a piezoelectric linear actuator. For example, the piezoelectric linear actuator may include a plurality of piezoelectric linear actuators stacked on top of one another. In some embodiments, the piezoelectric linear actuator could be configured to provide a desired axial expansion/contraction value based on a known or expected thermally-induced expansion or contraction of various components of optical system 100.

In some implementations, piezoelectric structure(s) 196 could form two or more stacks or posts arranged at respective positions along the substrate 130. For example, piezoelectric linear actuators may form four stacks, with a first stack positioned above image sensor 140, a second stack positioned below image sensor 140, a third stack positioned to the right of image sensor 140, and a fourth stack positioned to the left of image sensor 140 (when viewed from a top view). In such a scenario, each of the stacks could be configured to be separately controllable so as to adjust at least one of (i) a distance between lens(es) 112 and image sensor 140 or (ii) a tip or tilt of image sensor 140 with respect to focal plane 118, among other aspects of the geometric arrangement of elements in the optical system 100.

Actuator(s) 194 may be configured to maintain image sensor 140 at focal plane 118 and/or within a depth of focus of lens assembly 110 over a predetermined temperature range (e.g., −30 to 85° C.).

In various embodiments, actuator(s) 194 may additionally include stepper motor 198. For example, actuator(s) 194 could include piezoelectric structure(s) 196 and stepper motor 198, which could be configured to provide micro and macro movements, respectively, in the axial direction. In other words, piezoelectric structure(s) 196 could be utilized to provide fine axial position adjustments (e.g., less than ±100 microns) and stepper motor 198 could be configured to provide coarse axial position adjustments (e.g., greater than ±100 microns).

In some embodiments, optical system 100 could additionally include a thermal sensor 170. Thermal sensor 170 could be configured to provide information indicative of a current temperature of at least a portion of optical system 100. In such a scenario, at least one property of actuator(s) 194 could be configured to be adjusted based on the current temperature. In some embodiments, thermal sensor 170 could include a thermocouple, a thermometer, or another type of temperature-sensing device.

Additionally or alternatively, optical system 100 could include position sensor 180. Position sensor 180 could be configured to provide information indicative of a relative position of image sensor 140 and/or substrate 130 with respect to lens assembly 110 and/or lens holder 120. In such scenarios, at least one property of actuator(s) 194 could be configured to be adjusted based on the relative position of image sensor 140 and/or substrate 130 with respect to lens assembly 110 and/or lens holder 120.

In some embodiments, position sensor 180 may include magnet(s) 182 and magnetic field sensor(s) 184. For example, magnet(s) 182 may be mounted on lens holder 120 and magnetic field sensor(s) 184 may be mounted on substrate 130, or vice versa. In another example, magnet(s) 182 may be mounted on substrate 130 and magnetic field sensor(s) 184 may be mounted on PCB 160, or vice versa. Additionally or alternatively, position sensor 180 may include a capacitive displacement sensor, an ultrasonic sensor, an inductive sensor, an optical proximity sensor, a laser-doppler vibrometer, or a camera. Other types of position sensors are possible and contemplated.

In some embodiments, optical system 100 could also include controller 186. Controller 186 may include processor(s) 188 and memory 190. Additionally or alternatively, controller 186 may include at least one of a field-programmable gate array (FPGA) or an application-specific integrated circuit (ASIC). As an example, processor(s) 188 may include a general-purpose processor or a special-purpose processor (e.g., digital signal processors, etc.). Processor(s) 188 may be configured to execute computer-readable program instructions that are stored in memory 190. In some embodiments, processor(s) 188 may execute the program instructions to provide at least some of the functionality and operations described herein.

Memory 190 may include or take the form of one or more computer-readable storage media that may be read or accessed by processor(s) 188. The one or more computer-readable storage media can include volatile and/or non-volatile storage components, such as optical, magnetic, organic, or other memory or disc storage, which may be integrated in whole or in part with at least one of processor(s) 188. In some embodiments, memory 190 may be implemented using a single physical device (e.g., one optical, magnetic, organic, or other memory or disc storage unit), while in other embodiments, memory 190 may be implemented using two or more physical devices.

In some embodiments, the operations executable by controller 186 may include determining control signal 192 to compensate for a thermal focus shift between lens(es) 112 and image sensor 140. In such scenarios, the operations may also include providing control signal 192 to actuator(s) 194.

In embodiments involving thermal sensor 170, the operations could additionally or alternatively include receiving, from thermal sensor 170, information indicative of a current temperature of at least a portion of optical system 100. In such scenarios, determining control signal 192 could be based, at least in part, on the current temperature.

In embodiments involving position sensor 180, the operations may additionally or alternatively include receiving, from position sensor 180, information indicative of a relative position of image sensor 140 with respect to lens assembly 110 and/or lens holder 120. In such scenarios, determining control signal 192 could be based on the relative position of image sensor 140 with respect to lens assembly 110.

Figure 2:
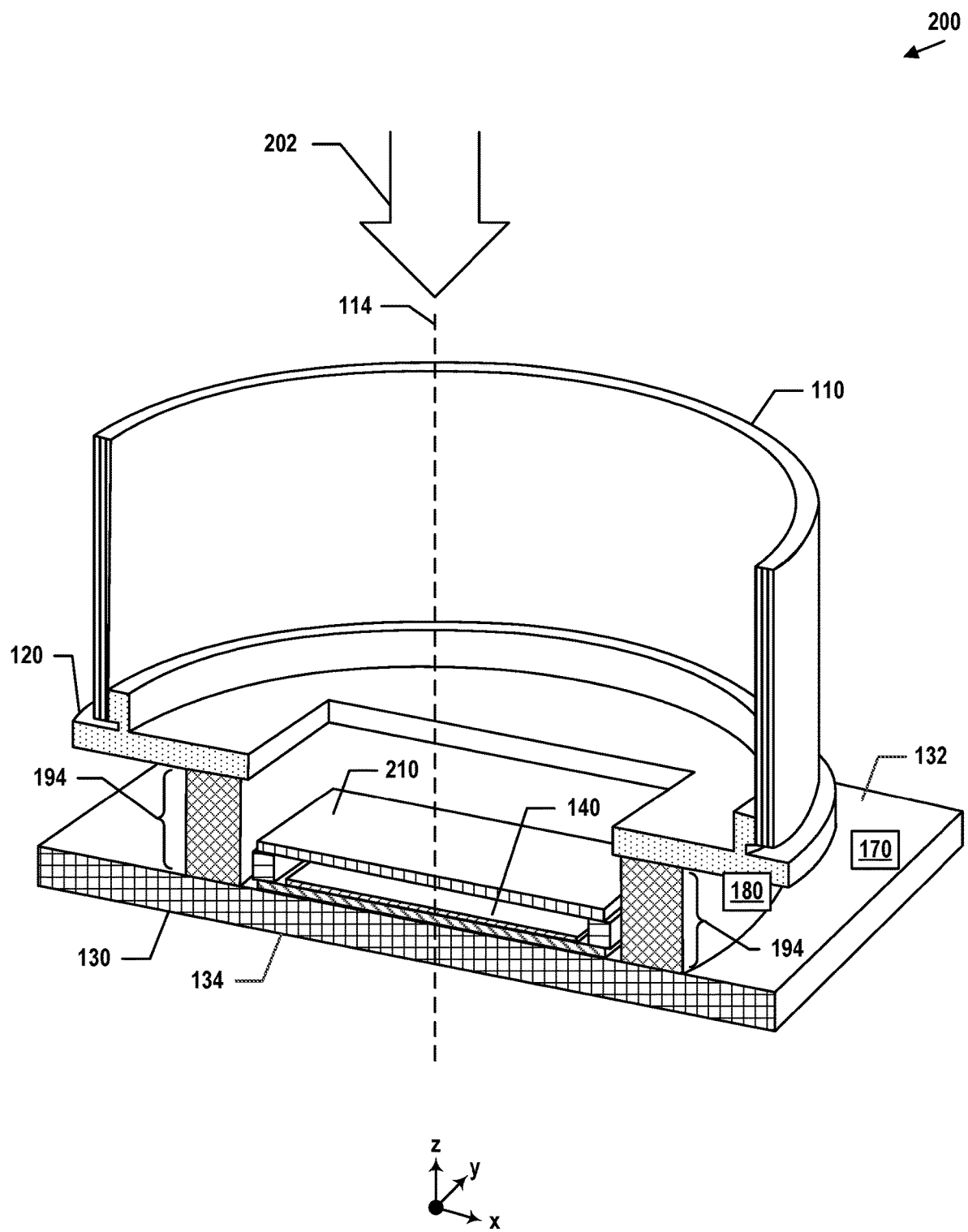
FIG. 2 illustrates an optical system, in accordance with example embodiments.

FIG. 2 illustrates optical system 200. Optical system 200 may include elements that are similar or identical to those of optical system 100, as illustrated and described in relation to FIG. 1. For example, optical system 200 may include substrate 130 having first surface 132 (e.g., top surface) and second surface 134 (e.g., bottom surface). Image sensor 140 may be mounted directly or indirectly (e.g., via a readout integrated circuit (ROTC)) to first surface 132 of substrate 130. In some embodiments, optical element 210 (e.g., an infrared filter) could be disposed along optical axis 114.

Optical system 200 may include actuator(s) 194 disposed between lens holder 120 and substrate 130. Lens holder 120 may be coupled to lens assembly 110, which may include one or more lens(es) 112, which may define optical axis 114, focal distance 116, and/or focal plane 118. Actuator(s) 194 may be configured to control a relative position of image sensor 140 with respect to lens assembly 110 and/or lens(es) 112. In some implementations, actuator(s) 194 may at least partially surround image sensor 140 and/or optical element 210, among other components. For example, the piezoelectric tube may continuously surround image sensor 140 (i.e., image sensor 140 may be disposed in an interior volume of the piezoelectric tube). In another example, stacks of the piezoelectric linear actuators may be disposed around image sensor 140 in a discontinuous fashion, such that space between these stacks may remain vacant.

Optical system 200 may include position sensor 180 and thermal sensor 170. It will be understood that while FIG. 2 illustrates position sensor 180 and thermal sensor 170 at particular locations with respect to other elements of optical system 200, other locations of position sensor 180 and thermal sensor 170 are possible and contemplated. Arrow 202 provides a reference point between the view of FIG. 2 and the views of FIGS. 3A, 3B, 4A, and 4B.

Figure 3A:
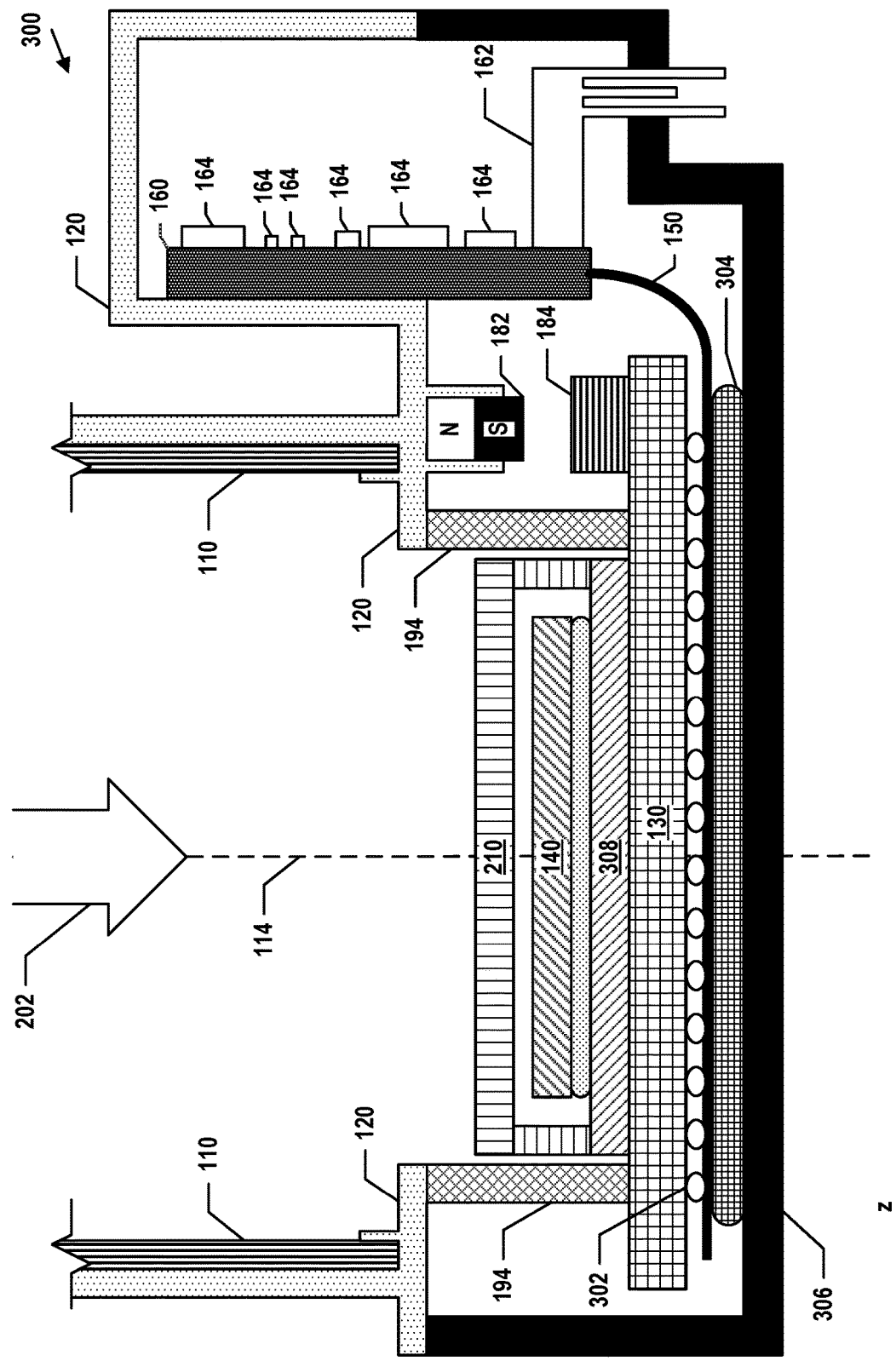
FIGS. 3A and 3B illustrate a position sensor in an optical system, in accordance with example embodiments.

FIG. 3A illustrates optical system 300. At least some elements of optical system 300 could be similar or identical to the elements of optical systems 100 or 200, as illustrated and described in relation to FIGS. 1 and 2. As illustrated in FIG. 3A, optical system 300 may include a "stackup" of substrate 130, actuator(s) 194, lens holder 120, and lens assembly 110. Alternative stackups are possible and contemplated. Image sensor 140 may be mounted on substrate 130 by way of portion 308 (e.g., a ceramic package portion) of an integrated circuit package in which image sensor 140 is contained.

Optical system 300 may also include PCB 160 connected to substrate 130 by way of flexible PCB connector 150. Flexible PCB connector 150 may be bonded to substrate 130 by way of anisotropic conductive film (ACF) bond 302, among other possibilities. PCB 160 may include thereon electrical components 164 and electrical connector 162. By placing electrical components 164 on PCB 160, rather than on substrate 130, the thermal load around image sensor 140 may be reduced, thus facilitating thermal management of optical system 300.

Optical system 300 may additionally include magnetic field sensor 184 and magnet 182. Magnet 182 may be mounted to lens holder 120 while magnetic field sensor 184 may be mounted on substrate 130, or vice versa. Mounting magnetic field sensor 184 on substrate 130 may facilitate routing of electrical signals from magnetic field sensor 184 to electrical components 164, where these signals may be processed to determine the distance between image sensor 140 and lens holder 120. On the other hand, when magnetic field sensor 184 is connected to lens holder 120, signals therefrom may be routed to PCB 160 by way of additional electrical connectors (e.g., wires) since lens holder 120 is not necessarily in electrical contact with PCB 160.

Although only one pair of magnet 182 and magnetic field sensor 184 is shown in the cross-sectional view of FIG. 3A, multiple such pairs may be disposed around image sensor 140. For example, four such pairs of magnet 182 and magnetic field sensor 184 may be provided in a symmetric arrangement around image sensor 140, thus allowing for monitoring of the tip (e.g., rotation along y-axis) and tilt (e.g., rotation along x-axis) of image sensor 140 in addition to monitoring the position of image sensor 140 along the z-axis.

Optical system 300 may further include housing 306, which may be connected to lens holder 120 so as to define a chamber between housing 306, lens assembly 110, and lens holder 120. The chamber may contain therein substrate 130, image sensor 140, actuator(s) 194, magnet 182, magnetic field sensor 184, and PCB 160, among other components. Housing 306 may shield and protect these components from the outside environment. Housing 306 may define therein an opening through which electrical connector 162 may protrude so as to be accessible outside housing 306, thus allowing optical system 300 to communicate with other components or systems.

In some implementations, thermal interface material (TIM) 304 may be disposed between housing 306 and flexible PCB connector 150. Thus, heat from image sensor 140 may be dissipated to housing 306 by way of substrate 130, ACF bond 302, flexible PCB connector 150, and TIM 304. Alternatively, TIM 304 may be in direct contact with substrate 130. For example, flexible PCB connector 150 and ACF bond 302 may be arranged along a periphery of substrate 130 to define an opening through which TIM 304 may directly contact substrate 130. This opening may be approximately circular or rectangular, among other possibilities, and may depend on the arrangement of electrical contact pads on the bottom side of substrate 130.

Figure 3B:
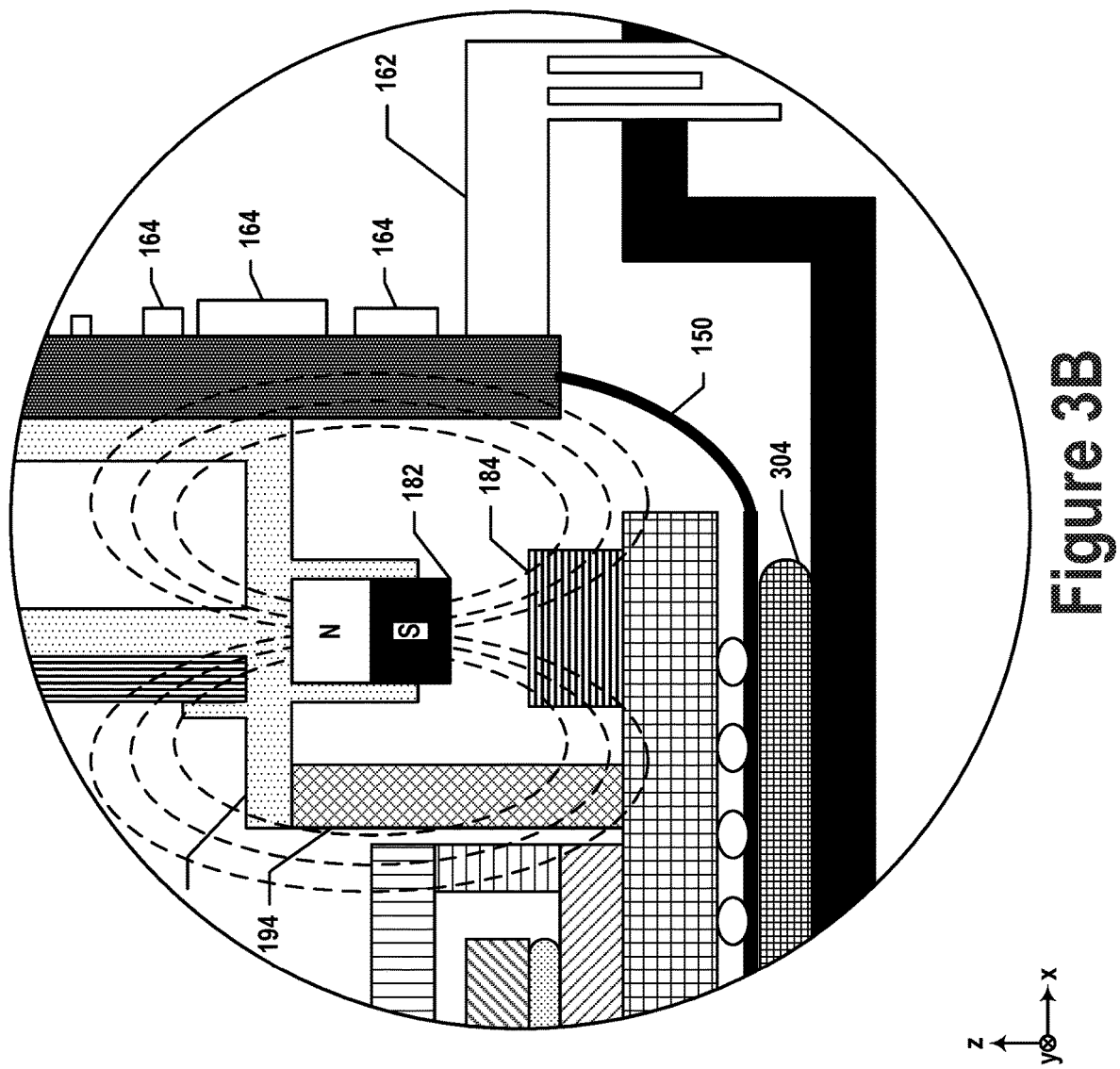

FIG. 3B illustrates a close-up view of a portion of optical system 300. Specifically, FIG. 3B illustrates magnetic field lines to indicate a magnetic field generated by magnet 182 that may be detected by magnetic field sensor 184. Magnetic field sensor 184 may be configured to measure a magnitude of the magnetic field along the z-direction. Thus, as lens holder 120 and magnet 182 move away from substrate 130 and magnetic field sensor 184, the measured magnitude of the magnetic field may decrease according to a predetermined relationship. Similarly, as lens holder 120 and magnet 182 move toward substrate 130 and magnetic field sensor 184, the measured magnitude of the magnetic field may increase according to the predetermined relationship. Thus, the relative position of lens holder 120 and substrate 130 may be determined based on the measured magnitude of the magnetic field using this predetermined relationship.

Figure 4A:
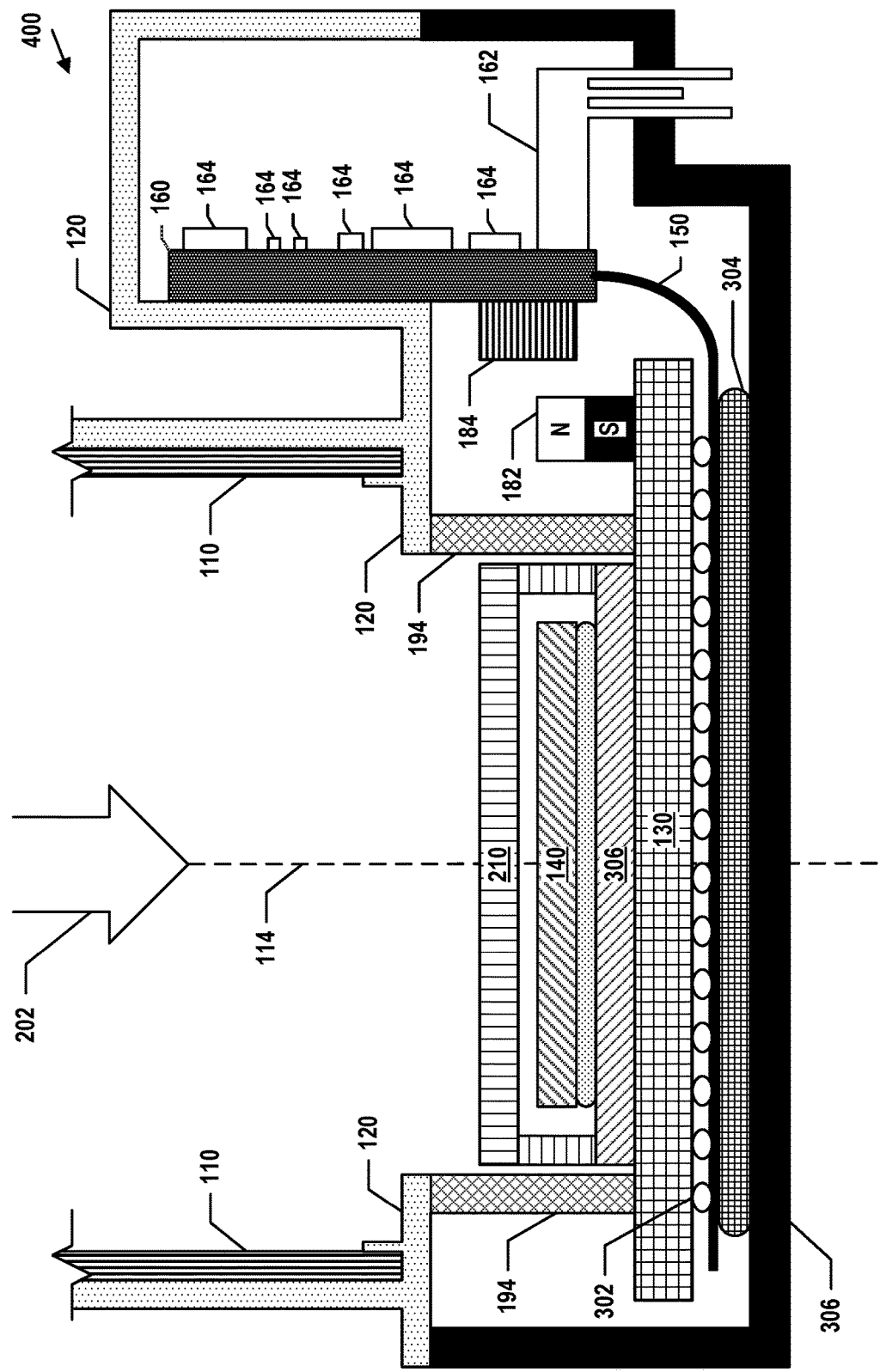
FIGS. 4A and 4B illustrate a position sensor in an optical system, in accordance with example embodiments.

FIG. 4A illustrates optical system 400. Some elements of optical system 400 may be similar or identical to elements of optical systems 100, 200, or 300, as illustrated and described in relation to FIGS. 1, 2, 3A, and 3B. Optical system 400 includes magnet 182 and magnetic field sensor 184 disposed in an alternative arrangement from that of FIGS. 3A and 3B. Specifically, magnet 182 may be connected to substrate 130 while magnetic field sensor 184 may be connected to PCB 160. In some implementations, magnet 182 may instead be connected to PCB 160 and magnetic field sensor 184 may be connected to substrate 130.

Both of these arrangements of magnet 182 and magnetic field sensor 184 may facilitate routing of signals from magnetic field sensor 184 to electrical components 164 because both substrate 130 and PCB 160 are electrically connected to electrical components 164. In the arrangement shown in FIG. 4A, magnetic field sensor 184 may be configured to measure the magnitude of the magnetic field generated by magnet 182 along the z direction and/or along the x direction.

As illustrated in FIG. 4A, A first portion of PCB 160 may be connected to lens holder 120 such that a plane defined by a surface of PCB 160 is substantially parallel to optical axis 114 (e.g., within 10 degrees of parallel). A second portion of PCB 160 might not be connected to lens holder 120, and may instead protrude away therefrom in the direction of substrate 130. Magnetic field sensor 184 may be connected to this second portion of PCB 160 so as to be positioned near magnet 182 and thus able to measure the magnetic field generated thereby. Additionally, a surface of substrate 130 may also define a plane that is substantially perpendicular to optical axis 114 (e.g., within 10 degrees of perpendicular). Thus, PCB 160 may be oriented substantially perpendicularly to substrate 130.

Figure 4B:
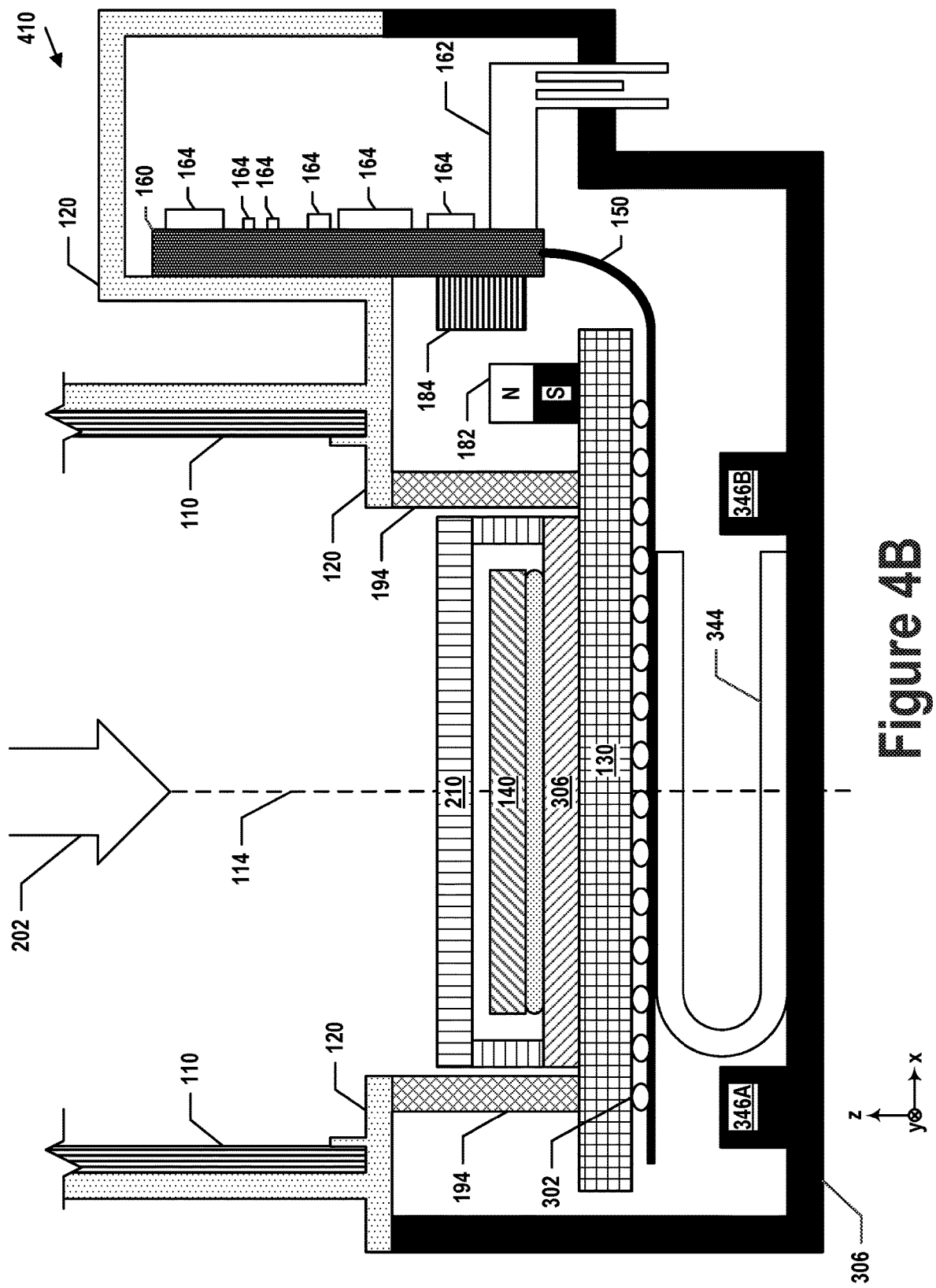
Figure 5A:
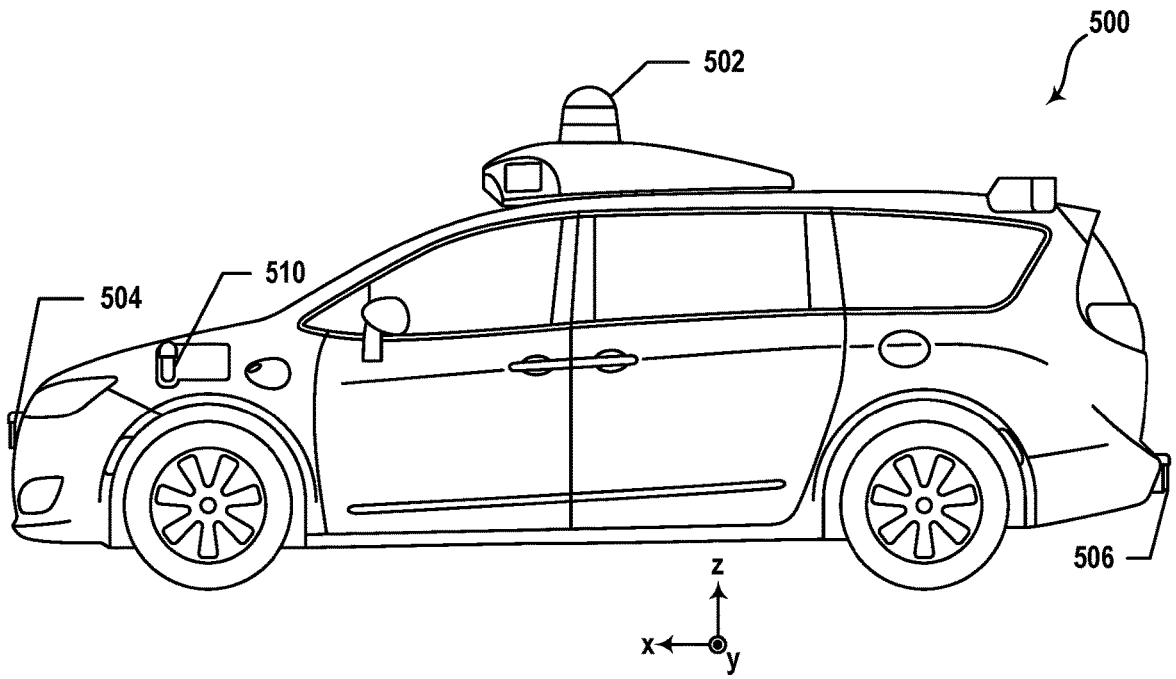
FIGS. 5A, 5B, 5C, 5D, and 5E illustrate a vehicle, in accordance with example embodiments.
Figure 5B:
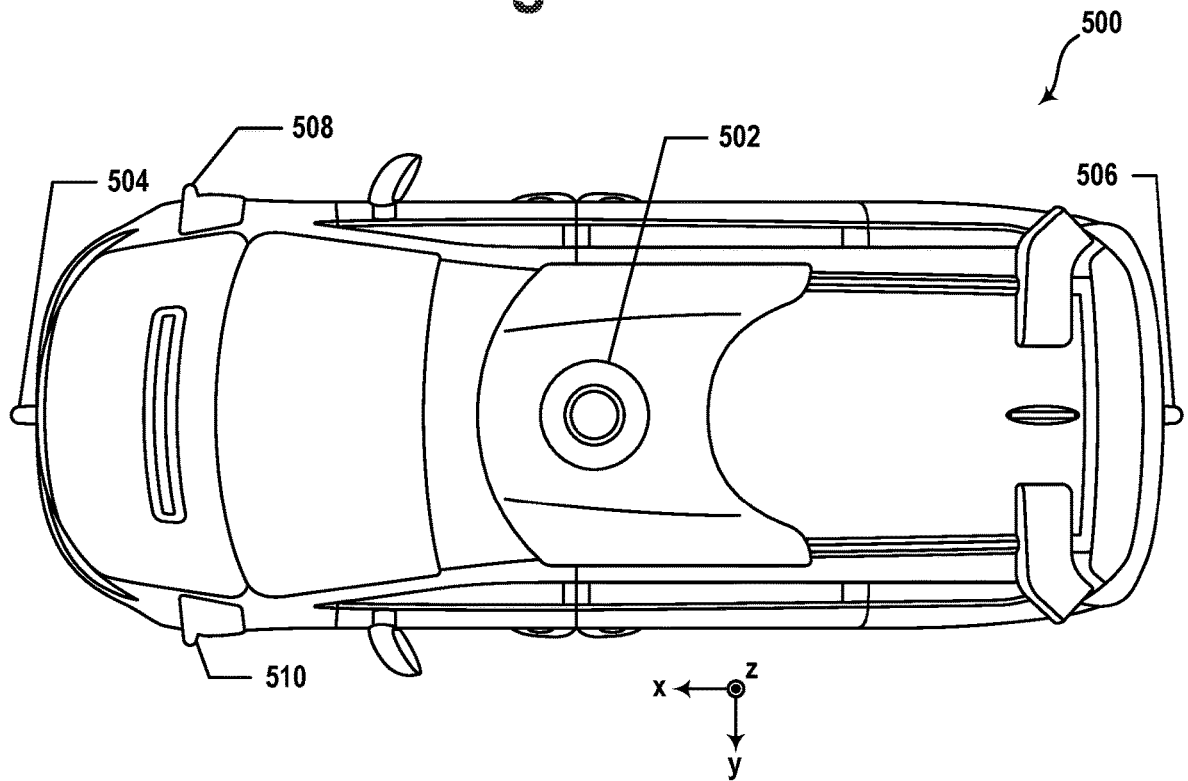
Figure 5C:
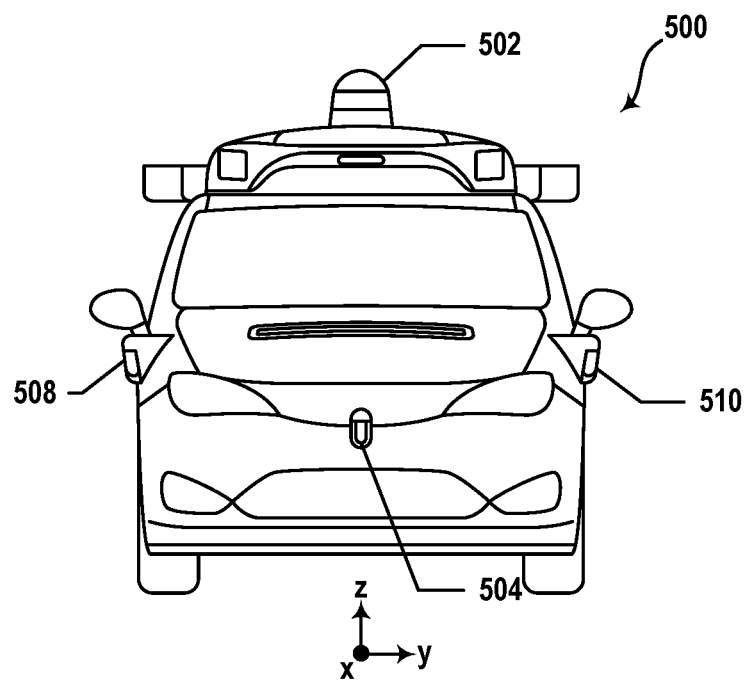
Figure 5D:
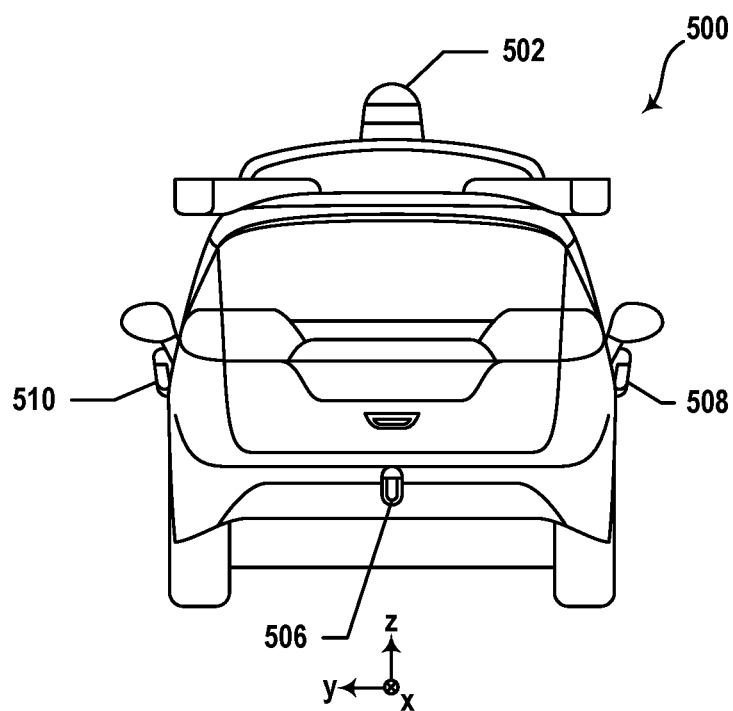
Figure 5E:
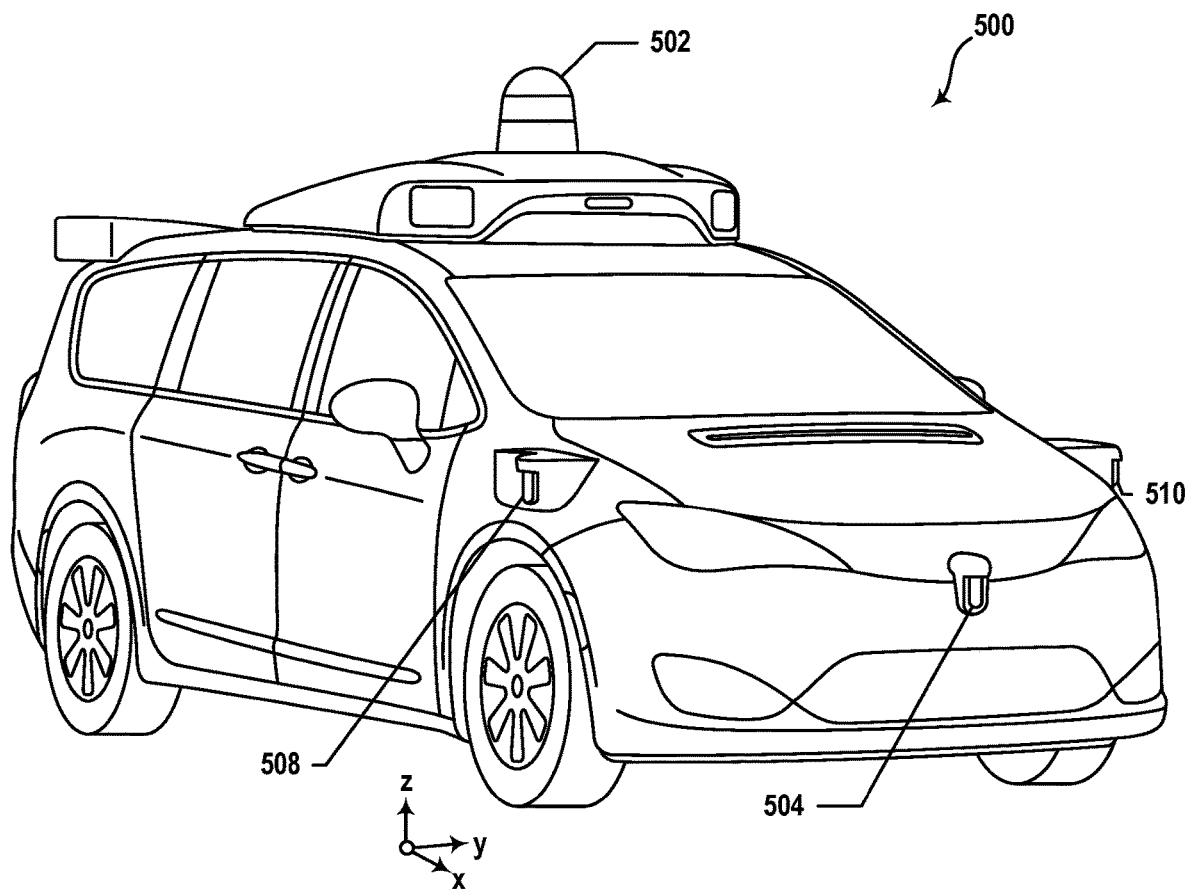

FIG. 4B illustrates optical system 410. Some elements of optical system 410 may be similar or identical to elements of optical systems 100, 200, 300, or 400, as illustrated and described in relation to FIGS. 1, 2, 3A, 3B, and 4A. Optical system 410 additionally includes spring 344 disposed between housing 306 and substrate 130 to bias substrate 130 towards lens holder 120. Biasing substrate 130 towards lens holder 120 may operate to preload piezoelectric structures 196. Housing 306 may include protrusions 346A and 346B that define a relief or space in which spring 344 is retained to reduce or prevent drifting. Spring 344 may also provide a thermal path by way of which heat generated by image sensor 140 may be dissipated to the outside environment. TIM may be provided between spring 344 and housing 306, as well as between spring 344 and substrate 130, to further facilitate heat transfer.

III. EXAMPLE VEHICLES

FIGS. 5A, 5B, 5C, 5D, and 5E illustrate a vehicle 500, according to an example embodiment. In some embodiments, the vehicle 500 could be a semi-autonomous or a fully-autonomous vehicle. While FIGS. 5A, 5B, 5C, 5D, and 5E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include optical systems 100, 200, 300, 400 and/or 410 as illustrated and described in relation to FIGS. 1, 2, 3A, 3B, 4A, and 4B. In other words, the optical systems described elsewhere herein could be coupled to the vehicle 500 and/or could be utilized in conjunction with various operations of the vehicle 500. As an example, the optical systems 100, 200, 300, 400 and/or 410 could be utilized in self-driving or other types of navigation, planning, perception, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 5A, 5B, 5C, 5D, and 5E.

In some embodiments, the one or more sensor systems 502, 504, 506, 508, and 510 could include image sensors. Additionally or alternatively the one or more sensor systems 502, 504, 506, 508, and 510 could include LIDAR sensors. For example, the LIDAR sensors could include a plurality of light-emitter devices arranged over a range of angles with respect to a given plane (e.g., the x-y plane). For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

While LIDAR systems with single light-emitter devices are described and illustrated herein, LIDAR systems with multiple light-emitter devices (e.g., a light-emitter device with multiple laser bars on a single laser die) are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

While FIGS. 5A-5E illustrate various sensors attached to the vehicle 500, it will be understood that the vehicle 500 could incorporate other types of sensors.

It will be understood that optical systems 100, 200, 300, 400, and 410 could be implemented with the LIDAR sensors and/or camera image sensors of vehicle 500 to compensate for thermal expansion effects that may otherwise negatively affect optical system performance. For example, the actuator(s) 194 of such optical systems could be configured to adjust an axial position of the respective image sensors 140 with respect to the respective lens assemblies 110 and/or respective lenses 112. It will be understood that the optical systems described herein could be incorporated in other ways with respect to the vehicle 500.

IV. ADDITIONAL EXAMPLE OPERATIONS

Figure 6:
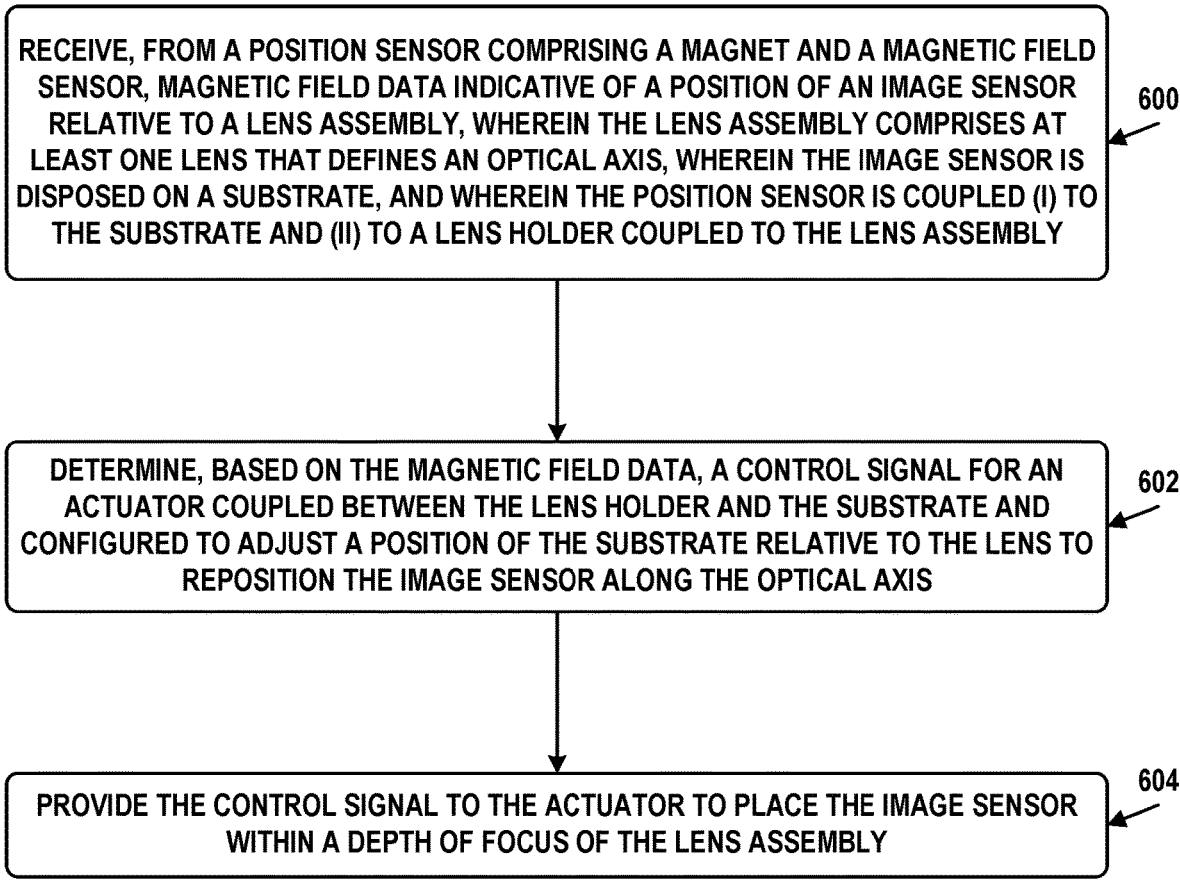
FIG. 6 illustrates a flow chart, in accordance with example embodiments.

FIG. 6 illustrates a flow chart of operations related to controlling an optical system. The operations may related to elements of and/or be carried out by optical systems 100, 200, 300, 400, and/or 410, among other possibilities. However, the process can be carried out by other types of devices or device subsystems. For example, the process could be carried out by a portable computer, such as a laptop or a tablet device. The embodiments of FIG. 6 may be simplified by the removal of any one or more of the features shown therein. Further, these embodiments may be combined with features, aspects, and/or implementations of any of the previous figures or otherwise described herein.

Block 600 may involve receiving, from a position sensor including a magnet and a magnetic field sensor, magnetic field data indicative of a position of an image sensor relative to a lens assembly. The lens assembly may include at least one lens that defines an optical axis. The image sensor may be disposed on a substrate. The position sensor may be coupled (i) to the substrate and (ii) to a lens holder coupled to the lens assembly.

Block 602 may involve determining, based on the magnetic field data, a control signal for an actuator. The actuator may be coupled between the lens holder and the substrate and configured to adjust a position of the substrate relative to the lens to reposition the image sensor along the optical axis.

Block 604 may involve providing the control signal to the actuator to place the image sensor within a depth of focus of the lens assembly.

In some embodiments, the magnet may be mounted on the substrate and the magnetic field sensor may be mounted on the lens holder.

In some embodiments, the magnet may be mounted on the lens holder and the magnetic field sensor may be mounted on the substrate.

In some embodiments, a PCB may be connected to the lens holder. The PCB may include one or more electrical connectors. A flexible PCB connector may electrically connect the substrate to the PCB such that electrical signals from the image sensor are provided by way of the one or more electrical connectors. The flexible PCB connector may provide a variable bend radius to accommodate adjustments in the position of the substrate relative to the lens holder.

In some embodiments, the magnet may be mounted on the substrate and the magnetic field sensor may be mounted on the PCB. Thus, the magnetic field sensor may be coupled to the lens holder by way of the PCB.

In some embodiments, the PCB may be coupled to the lens holder such that the PCB is substantially parallel to the optical axis and substantially perpendicular to a plane defined by a surface of the substrate. A first portion of a first surface of the PCB may be disposed along the lens holder. The magnetic field sensor may be mounted on a second portion of the first surface of the PCB that protrudes away from the lens holder and towards the substrate.

In some embodiments, the magnet may be mounted on the PCB and the magnetic field sensor is mounted on the substrate. Thus, the magnet may be coupled to the lens holder by way of the PCB.

In some embodiments, a housing may be coupled to the lens holder. The image sensor, the substrate, the PCB, the actuator, and the position sensor may be disposed in a chamber defined between the lens holder, the lens assembly, and the housing. The one or more electrical connectors may be exposed outside the housing.

In some embodiments, the image sensor may be bonded to a first side of the substrate. The flexible PCB connector may be bonded to a second side of the substrate. A thermal conductivity of the substrate may be higher than (i) a thermal conductivity of the PCB and (ii) a thermal conductivity of the flexible PCB connector. A housing may be coupled to the lens holder and a thermal interface material may be disposed between the substrate and a portion of the housing to dissipate heat from the image sensor to the housing by way of the substrate and the thermal interface material. A portion of the flexible PCB connector that is bonded to the second side of the substrate may define an opening through which the thermal interface material extends to make thermal contact with the substrate.

In some embodiments, the PCB may include a laminate-based PCB having a first CTE and the substrate may include a ceramic PCB having a second CTE. The image sensor may have a third CTE. A difference between the second CTE and the third CTE may be smaller than a difference between the first CTE and the third CTE.

In some embodiments, one or more electrical components may be disposed on the PCB and configured to process the electrical signals from the image sensor before the electrical signals reach the one or more electrical connectors.

In some embodiments, the image sensor may be disposed between the substrate and the lens assembly.

In some embodiments, the substrate may be disposed between the image sensor and the lens assembly. The substrate may define an opening that provides an optical path between the lens assembly and the image sensor.

In some embodiments, circuitry may be configured to control the actuator based on the magnetic field data. The circuitry may be configured to determine, based on the magnetic field data, the position of the substrate relative to the lens holder and control the actuator based on the position.

In some embodiments, the actuator may include a piezoelectric actuator.

In some embodiments, the actuator may be a linear actuator coupled to the substrate and to the lens holder and configured to contract and expand parallel to the optical axis to reposition the image sensor along the optical axis.

In some embodiments, the actuator may be a bending actuator coupled to the substrate and configured to induce bowing in the substrate along the optical axis to reposition the image sensor along the optical axis.

V. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An apparatus comprising:
a lens assembly comprising at least one lens that defines an optical axis;
a lens holder coupled to the lens assembly;
a substrate;
an image sensor disposed on the substrate;
an actuator coupled between the lens holder and the substrate and configured to adjust a position of the substrate relative to the lens assembly to reposition the image sensor along the optical axis;
a position sensor comprising a magnet and a magnetic field sensor, wherein the position sensor is coupled to the substrate and the lens holder, wherein the magnetic field sensor is configured to generate magnetic field data indicating a position of the substrate relative to the lens holder; and
circuitry configured to control the actuator based on the magnetic field data to place the image sensor within a depth of focus of the lens assembly.

2. The apparatus of claim 1, wherein the magnet is mounted on the substrate and the magnetic field sensor is mounted on the lens holder.

3. The apparatus of claim 1, wherein the magnet is mounted on the lens holder and the magnetic field sensor is mounted on the substrate.

4. The apparatus of claim 1, further comprising:
a printed circuit board (PCB) connected to the lens holder and comprising one or more electrical connectors; and
a flexible PCB connector electrically connecting the substrate to the PCB such that electrical signals from the image sensor are provided by way of the one or more electrical connectors, wherein the flexible PCB connector provides a variable bend radius to accommodate adjustments in the position of the substrate relative to the lens holder.

5. The apparatus of claim 4, wherein the magnet is mounted on the substrate and the magnetic field sensor is mounted on the PCB.

6. The apparatus of claim 5, wherein the PCB is coupled to the lens holder such that the PCB is substantially parallel to the optical axis and substantially perpendicular to a plane defined by a surface of the substrate, wherein a first portion of a first surface of the PCB is disposed along the lens holder, and wherein the magnetic field sensor is mounted on a second portion of the first surface of the PCB that protrudes away from the lens holder and towards the substrate.

7. The apparatus of claim 4, wherein the magnet is mounted on the PCB and the magnetic field sensor is mounted on the substrate.

8. The apparatus of claim 4, further comprising:
a housing coupled to the lens holder, wherein the image sensor, the substrate, the PCB, the actuator, and the position sensor are disposed in a chamber defined between the lens holder, the lens assembly, and the housing, and wherein the one or more electrical connectors are exposed outside the housing.

9. The apparatus of claim 4, wherein the image sensor is bonded to a first side of the substrate, wherein the flexible PCB connector is bonded to a second side of the substrate, wherein a thermal conductivity of the substrate is higher than (i) a thermal conductivity of the PCB and (ii) a thermal conductivity of the flexible PCB connector, and wherein the apparatus further comprises:
a housing coupled to the lens holder; and
a thermal interface material disposed between the substrate and a portion of the housing to dissipate heat from the image sensor to the housing by way of the substrate and the thermal interface material, wherein a portion of the flexible PCB connector that is bonded to the second side of the substrate defines an opening through which the thermal interface material extends to make thermal contact with the substrate.

10. The apparatus of claim 4, wherein the PCB comprises a laminate-based PCB having a first coefficient of thermal expansion (CTE), wherein the substrate comprises a ceramic PCB having a second CTE, wherein the image sensor has a third CTE, and wherein a difference between the second CTE and the third CTE is smaller than a difference between the first CTE and the third CTE.

11. The apparatus of claim 4, further comprising:
one or more electrical components disposed on the PCB and configured to process the electrical signals from the image sensor before the electrical signals reach the one or more electrical connectors.

12. The apparatus of claim 1, wherein the image sensor is disposed between the substrate and the lens assembly.

13. The apparatus of claim 1, wherein the substrate is disposed between the image sensor and the lens assembly, and wherein the substrate defines an opening that provides an optical path between the lens assembly and the image sensor.

14. The apparatus of claim 1, wherein the circuitry is configured to control the actuator based on the magnetic field data by:
determining, based on the magnetic field data, the position of the substrate relative to the lens holder; and
controlling the actuator based on the position.

15. The apparatus of claim 1, wherein the actuator comprises a piezoelectric actuator.

16. The apparatus of claim 1, wherein the actuator is a linear actuator coupled to the substrate and to the lens holder and configured to contract and expand parallel to the optical axis to reposition the image sensor along the optical axis.

17. The apparatus of claim 1, wherein the actuator is a bending actuator coupled to the substrate and configured to induce bowing in the substrate along the optical axis to reposition the image sensor along the optical axis.

18. A method comprising:
receiving, from a position sensor comprising a magnet and a magnetic field sensor, magnetic field data indicative of a position of an image sensor relative to a lens assembly, wherein the lens assembly comprises at least one lens that defines an optical axis, wherein the image sensor is disposed on a substrate, and wherein the position sensor is coupled (i) to the substrate and (ii) to a lens holder coupled to the lens assembly;
determining, based on the magnetic field data, a control signal for an actuator coupled between the lens holder and the substrate and configured to adjust a position of the substrate relative to the lens to reposition the image sensor along the optical axis; and
providing the control signal to the actuator to place the image sensor within a depth of focus of the lens assembly.

19. An apparatus comprising:
a lens assembly comprising at least one lens that defines an optical axis;
a lens holder coupled to the lens assembly;
a ceramic printed circuit board (PCB) including a surface that defines a plane;

an image sensor disposed on the surface and electrically connected to the ceramic PCB;

a laminate-based PCB coupled to the lens holder and comprising one or more electrical connectors;

a flexible PCB connector electrically connecting the ceramic PCB to the laminate-based PCB such that electrical signals from the image sensor are provided by way of the one or more electrical connectors;

an actuator coupled between the lens holder and the ceramic PCB and configured to adjust a position of the ceramic PCB relative to the lens assembly to reposition the image sensor along the optical axis; and a position sensor comprising a magnet coupled to the ceramic PCB and a magnetic field sensor connected to the laminate-based PCB, wherein the magnetic field sensor is configured to generate magnetic field data indicating a position of the image sensor relative to the lens assembly.

20. The apparatus of claim 19, wherein the laminate-based PCB is coupled to the lens holder such that the laminate-based PCB is substantially parallel to the optical axis and substantially perpendicular to the plane defined by the surface of the ceramic PCB, wherein a first portion of a surface of the laminate-based PCB is disposed along the lens holder, and wherein the magnetic field sensor is mounted on a second portion of the surface of the laminate-based PCB that protrudes away from the lens holder and towards the ceramic PCB.

* * * * *